United States Patent
Rork et al.

(10) Patent No.: US 9,578,455 B2
(45) Date of Patent: Feb. 21, 2017

(54) METHOD AND APPARATUS FOR DYNAMIC POSITION REPORTING RATE DETERMINATION

(71) Applicant: Ford Global Technologies, LLC, Dearborn, MI (US)

(72) Inventors: Joseph Paul Rork, Plymouth, MI (US); Kevin Michael Bullister, Dexter, MI (US); Kelly Lee Zechel, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 14/627,747

(22) Filed: Feb. 20, 2015

(65) Prior Publication Data
US 2016/0247330 A1    Aug. 25, 2016

(51) Int. Cl.
*H04W 4/02* (2009.01)
*H04W 4/04* (2009.01)
*G01C 21/26* (2006.01)
*G01C 21/20* (2006.01)

(52) U.S. Cl.
CPC .................. *H04W 4/021* (2013.01)

(58) Field of Classification Search
CPC ......... G07C 5/008; G01C 21/20; G01C 21/26; H04W 4/021; H04W 4/022; G08G 1/205; G08G 1/207
See application file for complete search history.

(56) References Cited

U.S. PATENT DOCUMENTS

| | | | |
|---|---|---|---|
| 5,561,851 A * | 10/1996 | Hubbell | H04W 84/08 455/512 |
| 8,653,956 B2 | 2/2014 | Berkobin et al. | |
| 8,686,841 B2 | 4/2014 | Macheca et al. | |
| 8,798,646 B1 | 8/2014 | Wang et al. | |
| 2002/0120394 A1* | 8/2002 | Rayne | G01S 1/045 701/408 |
| 2006/0099959 A1* | 5/2006 | Staton | B60R 25/00 455/456.1 |
| 2010/0148947 A1 | 6/2010 | Morgan et al. | |
| 2011/0256881 A1* | 10/2011 | Huang | G01S 5/0257 455/456.1 |
| 2014/0375480 A1* | 12/2014 | Morgan | G08G 1/207 340/990 |
| 2016/0014564 A1* | 1/2016 | Del Vecchio | G08G 1/20 455/456.2 |

(Continued)

OTHER PUBLICATIONS

Geo-Fencing, In Fleet Director, http://www.teletrac.com/fleet-director-software/software-features, Aug. 29, 2014.

*Primary Examiner* — Khoi Tran
*Assistant Examiner* — Dale Moyer
(74) *Attorney, Agent, or Firm* — Jennifer Stec; Brooks Kushman P.C.

(57) ABSTRACT

A system includes a processor configured to receive a geo-fence definition defining a geographic perimeter or point. The processor is also configured to receive a vehicle location. Further, the processor is configured to determine a distance from the vehicle location to a most proximate geo-fence point and determine a reporting-rate that varies based on proximity to the geo-fence. The processor is also configured to report a vehicle location at intervals defined by the reporting-rate.

15 Claims, 3 Drawing Sheets

(56) References Cited

U.S. PATENT DOCUMENTS

2016/0054428 A1* 2/2016 Eldic .................. H04B 17/27
 455/574
2016/0057572 A1* 2/2016 Bojorquez Alfaro . H04W 4/021
 455/411

* cited by examiner

METHOD AND APPARATUS FOR DYNAMIC POSITION REPORTING RATE DETERMINATION

TECHNICAL FIELD

The illustrative embodiments generally relate to a method and apparatus for dynamic position reporting rate determination.

BACKGROUND

When someone is using a vehicle that belongs to another party, or when a driver who is monitored by another party is using a vehicle, it may be desirable to know whether or not that vehicle has traveled into any prohibited areas. Employers may wish to know if employees make stops at bars or take vehicles carrying valuable cargo into unsafe areas. Parents may wish to know if teenage drivers are complying with rules about where the driver is allowed to go. Likewise, vehicle rental companies may prohibit rented vehicles from traveling across state lines, or may apply surcharges for traveling outside a designated area. Although it is impractical to follow every vehicle to monitor its position, telematics systems make it easy for a vehicle to report a position.

Even when a position is reported, the user may not know how close the vehicle is to a prohibited area based on the position. To assist the monitoring user, geo-fences defining prohibited areas can be defined. For example, an employer could define a 100 foot geo-fence around all bars. Or a parent could define a geo-fence surrounding an area in which travel is permitted, effectively fencing off the rest of the world outside the fence. Geo-fences can even be used to alert drivers, if, for example, the fence is defined around an environmental hazard. The driver could be notified of proximity to the hazard and could thus avoid the area defined by the fence, containing the hazard.

As vehicles travel, they may approach or breach these geo-fences. In order to ensure that travel within a prohibited area is not achieved, or is at least not achieved for a prolonged period of time, reporting systems must report with reasonable frequency, so that the likelihood of breach can be ascertained and/or an actual breach can be detected before the vehicle travels too far into a prohibited/undesirable area.

SUMMARY

In a first illustrative embodiment, a system includes a processor configured to receive a geo-fence definition defining a geographic perimeter or point. The processor is also configured to receive a vehicle location. Further, the processor is configured to determine a distance from the vehicle location to a most proximate geo-fence point and determine a variable reporting-rate that varies based on proximity to the geo-fence. The processor is also configured to report a vehicle location at intervals defined by the variable reporting-rate.

In a second illustrative embodiment, a computer-implemented method includes receiving a vehicle location and heading. The method also includes receiving a geo-fence definition. Further, the method includes determining if the vehicle is traveling towards the geo-fence based on the heading. The method additionally includes determining, via a computer, a variable reporting-rate based on vehicle proximity to the geo-fence when the vehicle is traveling towards the geo-fence, and based on a standard reporting-rate when the vehicle is not traveling towards the geo-fence. The method also includes reporting a vehicle location at intervals defined by the variable reporting-rate.

In a third illustrative embodiment, a non-transitory computer-readable storage medium, stores instructions that, when executed by a processor, cause the processor to perform a method including receiving a geo-fence definition. The method also includes receiving a vehicle route. Also, the method includes defining a plurality of reporting rate changes along the route, at defined points along the route, based on the proximity of each defined point to the geo-fence. The method further includes varying a reporting rate as a vehicle reaches each of the defined points, based on the rate change defined for each point and reporting a vehicle location at intervals based on the reporting rate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
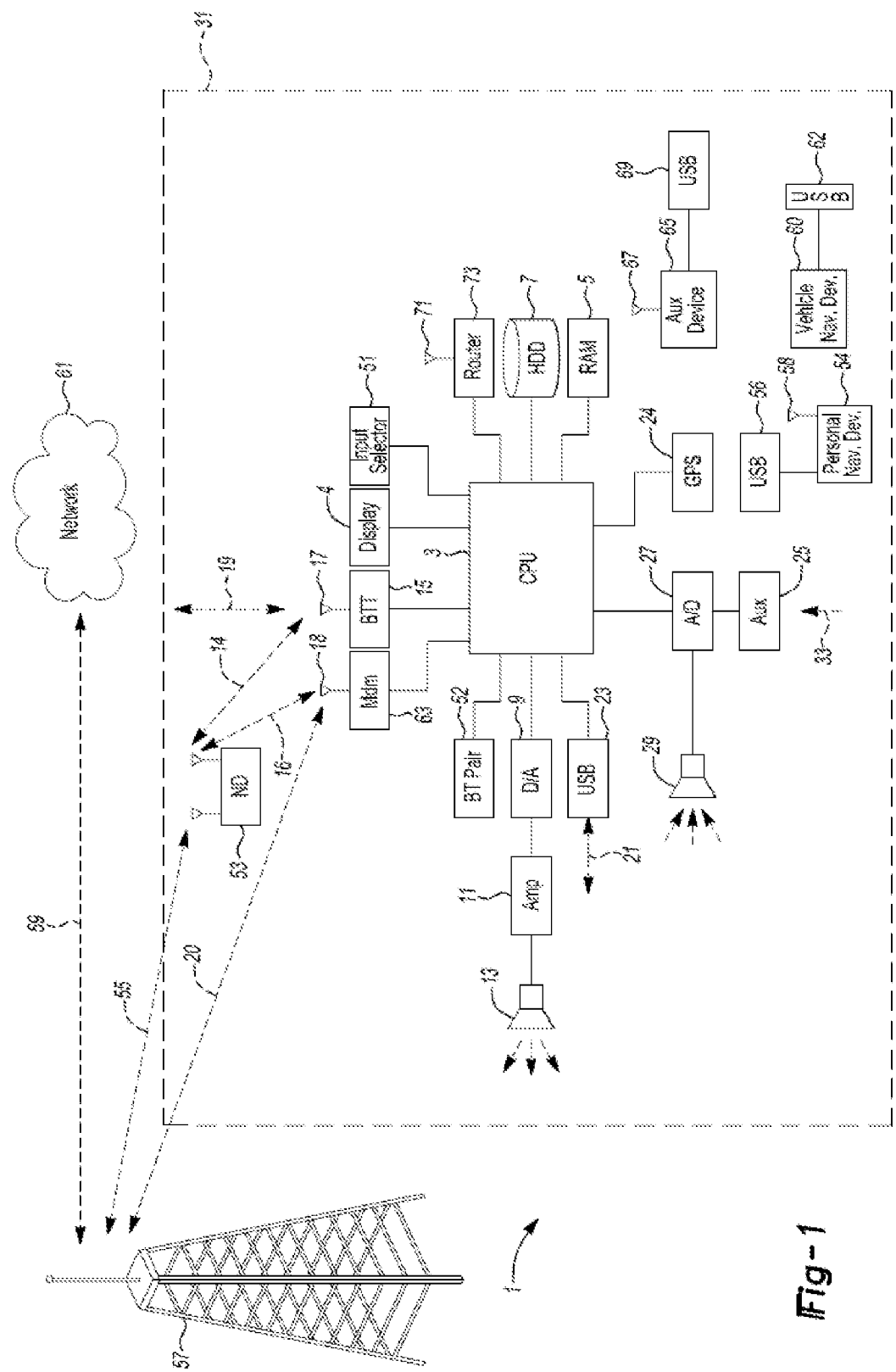
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

The network 61 can include cloud-based computing capability, which can be leveraged to perform some or all aspects of the illustrative embodiments. Information can be shared between the cloud, a nomadic device 53 and the vehicle computer. Any of these systems are independently capable of performing the illustrative embodiments (within reason, i.e., if the process calls for a vehicle sensor input, that step will likely be performed at the vehicle). Also, the processes can be performed between the various processing entities as appropriate or desired in a particular configuration.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

Nomadic devices 53 can include, but are not limited to, tablets, PCs, smartphones, etc. Generally, these include devices having independent processing power and capability. All functionality of the illustrative embodiments (to the extent reasonable) can be performed via an application running on the nomadic device, working alone or in conjunction with a vehicle computer and/or cloud based computing available via network 61.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

While vehicle telematics systems are capable of remote communication to report vehicle locations, this reporting still comes at a cost. Whether it is a monetary cost associated with data transfer, or a bandwidth cost affecting the speed of an entire network, the cost is real and it increases with an increased reporting rate. If a vehicle is a long distance/time from the nearest geo-fence, a high reporting rate is not necessarily needed. Since the vehicle cannot physically cross the nearest fence until the distance is traveled, a lower reporting rate will still give ample warning such that any monitoring party can be assured of the vehicle's compliance.

As the vehicle nears a geo-fence, the time or distance needed to cross the fence decreases, and the likelihood of a breach increases. If the lower reporting rate were maintained, the monitoring party may have insufficient time to notice that the vehicle has reached or crossed a fence. Accordingly, in the illustrative embodiments, reporting rates are increased with increased proximity to a geo-fence, and decreased with a decreased proximity to a geo-fence. Heading, speed, road speed limits and present location, as well as traffic and weather can also be factors affecting the reporting rate. In this manner, significant cost over an entire reporting system can be saved, because increased reporting is preserved for vehicles in closer proximity to geo-fences, as opposed to decreased reporting for vehicles that are further from geo-fences, saving cost and bandwidth.

Figure 2:
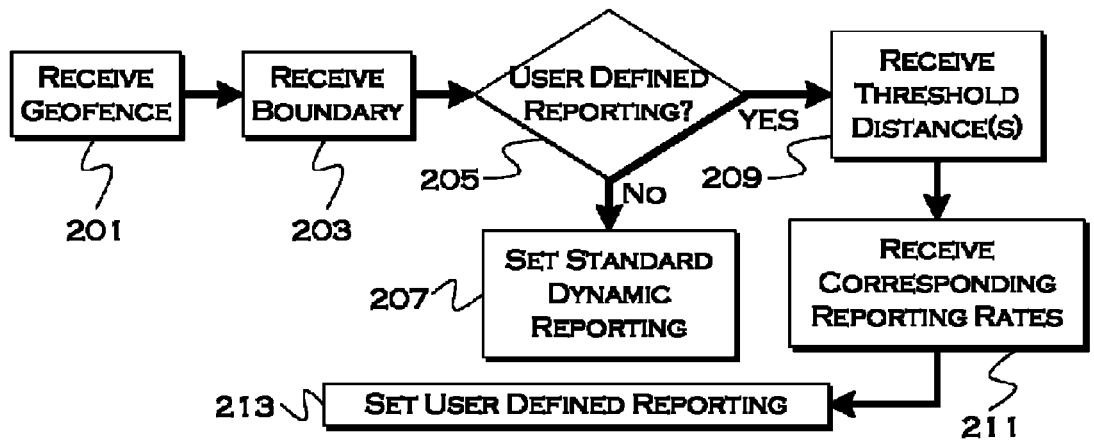
FIG. 2 shows an illustrative process for geo-fence definition.

FIG. 2 shows an illustrative process for geo-fence definition. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a user (monitoring entity, driver, occupant, etc.) is able to define a geo-fence and set reporting rates based on the geo-fence. The rates can vary and be based on proximity to a fence or even whether a vehicle is within a fence, and for how long. For example, an employer who doesn't want his employees taking the company van for beers on the way home from a job, may not care about a vehicle approaching a 100 foot perimeter around a bar, or even if the vehicle enters the perimeter (since the perimeter may overlap the road). But, increased reporting may be engaged while the vehicle is within or in close proximity to the perimeter, to ensure that the vehicle does not remain close to or within the perimeter for too long.

In another example, a parent may define a fifteen mile perimeter around a home location. If the driver is within ten miles of the house, the parent may not care about the particular driver location, and thus may instruct decreased or no reporting. If the driver approaches within five miles of the geo-fence, however (or travels more than 10 miles from the house), the parent may wish to have significantly increased reporting engaged, to ensure that the location is noted and the parent has ample time to call or warn the driver that they are traveling towards a restricted area.

In this illustrative example, one or more geo-fences (which may defined areas within which a vehicle is to remain or areas within which a vehicle is not to enter) are received/defined. These can also include weather/traffic related geo-fences. For example, a driver may wish to avoid all traffic traveling below 5 mph, and so the system may dynamically define geo-fences around such traffic. As the driver approaches such traffic, the reporting rate can increase, so the driver is not in a situation where it is "too late" to change a course to avoid the traffic.

Each geo-fence has one or more related boundaries associated therewith, which are also received 203. Since a vehicle/device (as the tracking and reporting could be done by a cellular phone or other mobile device, or from a server receiving vehicle coordinates) with capability to dynamically adjust reporting rates may have a default setting (e.g., without limitation, vary reporting rate by 1/X, where X is the distance to a geo-fence), the user can be given the option to define a reporting rate 205. If the user declines to define the reporting rate, the process may use a standard dynamic reporting rate adjustment 207.

On the other hand, if the user elects to define a reporting rate, the user may define one or more threshold distances for changing the reporting rate 209. The user could also define a formula for rate adjustment, such as, for example, 1/X−0.2, where negative numbers are treated as 0, such that no reporting engages until a vehicle is within five miles of a geofence.

In other instances, the user may wish to have some reporting engage within a first perimeter, but may want increases in reporting to accelerate in a non-formulaic manner. For example, if a vehicle is within 10 miles of a geo-fence, the monitoring party may be content with reporting that occurs every 10 minutes. But if the vehicle is within 5 miles of the fence, the reporting may be desired every 2 minutes. And if the vehicle is within 2 miles of the fence, the reporting may be desired every 15 seconds. Accordingly, the user can set distance or time boundaries (based on a vehicle speed×distance, for example) around a fence. Setting a time boundary based on road speed limits can have the affect of providing a varied-distance boundary around a fence (since different roads approaching the fence may have different speeds), but still may provide ample time warning, assuming the driver isn't traveling in complete disregard of speed limits.

The user can also define appropriate reporting rates corresponding to each set boundary 211. For example, the rates above would be set with respect to rate adjusting boundaries at 10 miles, 5 miles and 2 miles. Further increased or decreased rates could be set as needed. As can be seen in even this simple example, a vehicle within 2 miles of a fence would report 40 times within a 10 minute span, using significantly more communication resources than a vehicle within 10 miles of the boundary, which would only report once. Once the user definitions of reporting rate variances have been defined, these can be set on the reporting device or vehicle 213. For example, a monitoring user may use a phone or web application to define geo-fences and reporting rates. Since the phone or computer used to define the rates may not be doing the reporting, reporting rate variances may be uploaded to the device or vehicle that is actually doing the reporting, once set.

Figure 3:
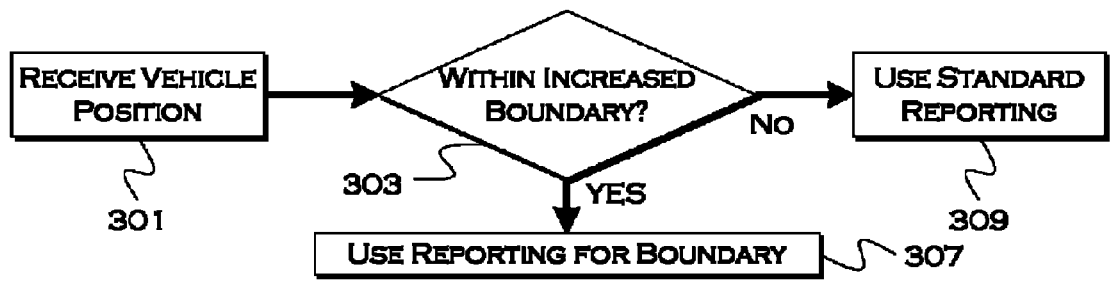
FIG. 3 shows an illustrative process for reporting rate setting.

FIG. 3 shows an illustrative process for reporting rate setting. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives a vehicle position 301. This position is used to determine the vehicle proximity to one or more geo-fences. Based on usage requirements, and whether or not discrete connections take more resources than batch reporting, reporting can be done for all local geo-fences at the same time, or on a fence-by-fence basis. For example, if three geo-fences were within a reporting area, and one was two miles away, one was five miles away, and one was ten miles away, the process may elect to report proximity to all three fences based on the two mile distance to the nearest fence. Or, if the system were concerned with the volume of data being transferred, each fence could have a separate reporting rate associated therewith, and have individual reporting sent at the appropriate times, based on the appropriate corresponding rate.

For one or all fences, in this example, depending on how reporting is done, the process determines if the vehicle is within a boundary for which an increased reporting rate applies. It may be the case that rates always vary based on distance to a fence, but it may also be the case, as in this example, that outside a certain proximity a standard reporting rate applies. If the vehicle is not subjected to increased reporting rates, based on proximity, for a given fence, the system may default to using the standard reporting rate 305. On the other hand, if the vehicle is within a range or operating under an algorithm that utilizes a dynamically adjustable reporting rate, the user/system-defined increased/decreased rate may be used, based on proximity 307.

Figure 4:
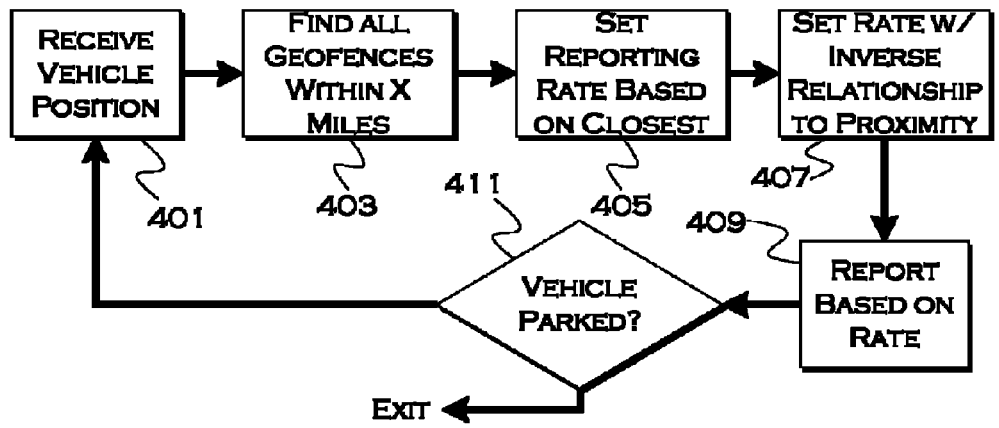
FIG. 4 shows a further illustrative process for reporting rate setting.

FIG. 4 shows a further illustrative process for reporting rate setting. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives a vehicle position 401, to be used to determine proximity to one or more geo-fences. This is typically GPS coordinates, but could be any suitable positioning identifier usable to identify a vehicle location. Based on the received vehicle position, the process identifies one or more geo-fences within a certain distance (X miles) of the present vehicle location 403.

The determination of which geo-fences to identify may be based on the type of monitoring. For example, for a parent with a teenage driver, all geo-fences may be loaded and tracked each time the vehicle is driven. On the other hand, if a fleet manager has fifteen vehicles to track, and various geo-fences defined over a large area, the manager may only be interested in the vehicle to fence relationship for fences within a certain distance (e.g., without limitation, 20 miles) of the vehicle.

In this example, the reporting will be done in batches (i.e., all fence data will be reported at a single selected rate), although, as previously noted, individual reporting rates for each fence could also be sent. In this example, the process sets a reporting rate based on a closest fence 405, since that is the most likely fence to be crossed in the shortest period of time. Also, in this example, the rate is set based on an inverse relationship with respect to proximity to the geo-fence 407. This does not necessarily have to be formulaic in nature, but rather generally indicates that as the vehicle gets closer to a fence, the reporting rate for at least that fence is increased, and when the vehicle gets further from a fence, the reporting rate for at least that fence is decreased (unless batch reporting is used, and the vehicle obtains a reporting rate setting from a different fence that dictates a different result).

In this example, once the rate is set, the process reports based on the set rate 409. As long as the vehicle is not in a parked state 411, the process may repeat. It is possible that different fences are used as a basis for reporting rates at some point during travel. For example, if the vehicle was six miles from fence A and four miles from fence B, then in this example, the proximity to fence B would be the basis for the reporting rate. But, if the vehicle were traveling towards fence A, after traveling 1.1 miles the vehicle would be 4.9 miles from fence A and 5.1 miles from fence B. Once the intermediate distance (in this case 5 miles) between the two fences was crossed, the new most-proximate fence would provide the basis for reporting. As previously noted, each fence could also have an individual reporting rate associated therewith, if batch reporting was not desired or not optimal.

If only the vehicle location is reported (and any correspondence to geo-fences is later determined by another process or a user), then it makes sense to have a single reporting rate defined by a most proximate geo-fence (since that is the fence most likely to be crossed). On the other hand, if proximity to geo-fences is reported (for example, if a parent receives a text message indicating proximity to various geo-fences), then it may make sense to use the batch reporting or the per-fence reporting, depending on user and system manager preferences. For example, a parent may want batch reporting just to avoid having too many individual text messages sent, and instead to receive the proximity to a most-proximate geo-fence at the appropriate interval, as well as information relating to other, further geo-fences, at that time.

Figure 5:
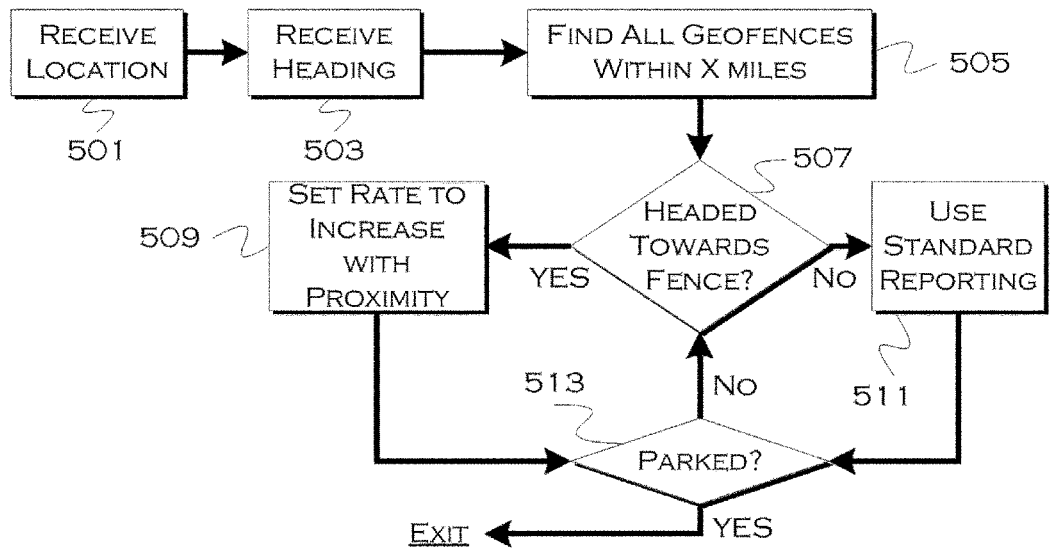
FIG. 5 shows yet another illustrative process for reporting rate setting.

FIG. 5 shows yet another illustrative process for reporting rate setting. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, the process again receives the vehicle location to be used as the basis for reporting 501. Also, in this example, the process receives the vehicle heading 503. In this illustrative example of reporting rate variance, a vehicle heading will be used in determining which rate to use. In this example, the process will find all geo-fences, or all geo-fences within a predefined distance, for example. In at least one example, the predefined distance is based at least in part on a vehicle speed. For example, if a vehicle is traveling at sixty miles per hour, the process may find all geo-fences within twenty miles of a present location. But if the vehicle is traveling at thirty miles per hour, the process may find geo-fences within ten miles of a present location. The user could also specify to find all geo-fences that can be reached in X minutes (based on road speed limits, or current vehicle speed, for example).

Also, in this illustrative example, the process checks to see if the vehicle is headed towards a geo-fence. Even if the vehicle is not headed directly towards a fence, some tolerance (e.g., without limitation, 135 degree arc centered on the front of the vehicle) could be defined to determine if the vehicle is heading "towards" the fence. If the vehicle is not headed towards any fence, then standard or decreased reporting could be used 511. Since the vehicle will have to turn around (or go into reverse) to cross the fence, and since the process will change the reporting rate if the heading changes, the monitoring entity may not be overly concerned with a vehicle headed away from a geo-fence. Thus, in this example, standard or decreased reporting is sufficient.

On the other hand, if the vehicle is headed towards the fence, the process may utilize proximity based increasing reporting 509, as the vehicle progresses towards the fence. In both instances, until the vehicle is parked 513, the process may continue to check the heading and change a reporting rate based on the heading in conjunction with the location.

For example, if a driver was headed towards a fence and was three miles out, the process may report once per minute. This could cause the monitoring entity to alert the driver of the likelihood of crossing the fence. At this point, the driver could change a vehicle route, and head away from the fence. Accordingly, since the driver corrected the behavior to avoid the fence, the monitoring entity may not need the updated reporting. If the driver turned back towards the fence, the heading would cause the increased reporting speed to kick back in, and the monitoring entity could again track the progress of the vehicle. In a slight alternative to this example, the process could additionally or alternatively receive a current vehicle road, and determine if the road itself passed through or within a proximity to the geo-fence at some point. Thus, if a winding highway passed through the fence, even if the present heading did not indicate travel towards the fence, presence on the highway might indicate such travel. Similarly, although heading might indicate the vehicle is traveling towards the geo-fence, the present road may never actually cross the fence, or even provide a route option to cross the fence, so diminished reporting rates may be used.

Figure 6:
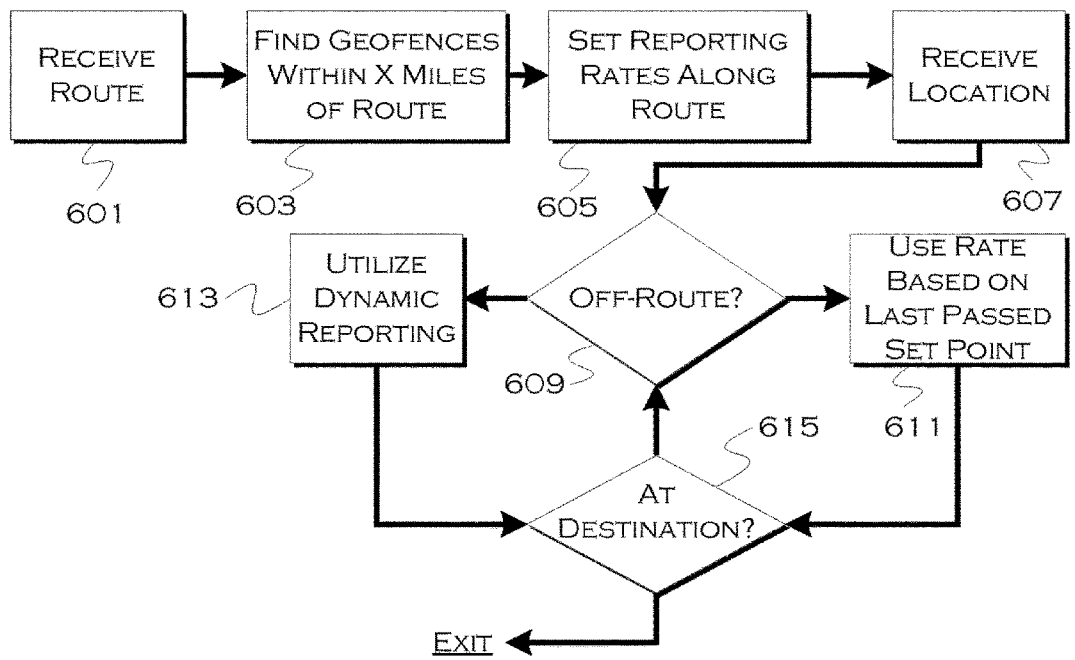
FIG. 6 shows still yet another illustrative process for reporting rate setting.

FIG. 6 shows still yet another illustrative process for reporting rate setting. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process again receives a route to be considered 601. In this illustrative example, the reporting rate changes will be set based on route points, as different points along a route bring a vehicle within different proximities to one or more geo-fences. In this example, the process finds all geo-fences with X miles of a given route (or loads all geo-fences, or finds geo-fences within X minutes, etc.) 603.

Since the route defines a planned path of travel, the process will assume that the vehicle will travel along the route, and will set reporting rate changes at different positions along the route in accordance with known geo-fences and the proximities thereto. Once all geo-fences to be considered are loaded, the process can set reporting rate change points at various points along the route 605. When a vehicle reaches or passes one of these points, the reporting rate can change, as the vehicle may be closer to or further from a geo-fence at that point. In at least one embodiment, the reporting rate may constantly be changing with relationship to vehicle location to fence location, but in other examples, such as this one, discreet changes in the rate can be specified at intervals of proximity. The correspondence of those proximity intervals with the route can serve to define where on the route the changes are noted.

Once the route and change points have been defined, the process can receive a vehicle location 607. If the vehicle is still on the route 609, the process will use the reporting rate corresponding to a current segment (i.e., defined by the last passed change point, or the initial reporting rate) 611. If the vehicle travels off-route 609, the process may engage dynamic reporting based on a most-proximate geo-fence, for example 613. This can persist until the vehicle returns to the route or until a new route with new reporting points is calculated. In this manner, even if a user deviates from a planned route, dynamic reporting rates based on actual proximity to a known fence may be utilized, so that the monitoring entity will be able to track the user as the user approaches a fence. These processes may be repeated until a user reaches a known destination 615, or, for example, a vehicle is placed in park.

Through utilization of these illustrative and similar reporting rate adjustments based on vehicle proximity to geo-fences, significant resources may be saved and a large amount of unnecessary reporting can be avoided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a geo-fence definition defining a geographic perimeter;
receive a vehicle location;
determine a distance from the vehicle location to the geo-fence;
determine a variable reporting rate that varies inversely with the distance to the geo-fence; and
report a vehicle location at intervals defined by the variable reporting rate.

2. The system of claim 1, wherein the processor is configured to receive a plurality of geo-fence definitions for a plurality of geo-fences.

3. The system of claim 1, wherein the processor is configured to determine the variable reporting rate based on a user-defined variable reporting rate corresponding to a present distance from the closest geo-fence point.

4. The system of claim 1, wherein reporting the vehicle location includes reporting a distance to the closest geo-fence point.

5. A computer-implemented method comprising:
receiving a vehicle location and heading;
receiving a geo-fence definition;
determining if the vehicle is traveling towards the geo-fence based on the heading;
determining, via a computer, a variable reporting rate that varies inversely based on vehicle proximity to the geo-fence when the vehicle is traveling towards the geo-fence, and based on a standard reporting rate otherwise; and
reporting a vehicle location at intervals defined by the variable or standard reporting rate based on vehicle heading.

6. The method of claim 5, wherein determining if the vehicle is traveling towards the geo-fence includes determining if a heading defined by an arc in front of the vehicle indicates travel towards any point of the geo-fence.

7. The method of claim 5, further comprising receiving a present road indicator, and determining if the vehicle is traveling towards the geo-fence based on the present road indicator and the vehicle heading.

8. The method of claim 5, wherein the standard reporting rate is a user-defined rate.

9. The method of claim 5, wherein the reporting rate based on the vehicle proximity to the geo-fence is user defined and varies at discrete intervals from the geo-fence.

10. The method of claim 9, wherein the discrete intervals are based on distance from the geo-fence.

11. The method of claim 9, wherein the discrete intervals are based on projected travel time to the geo-fence.

12. The method of claim 11, wherein the projected travel time is based on a vehicle speed and a distance to the geo-fence.

13. The method of claim 11, wherein the projected travel time is based on a road speed limit and a distance to the geo-fence.

14. The method of claim 11, wherein the reporting includes reporting the vehicle proximity to the geo-fence.

15. A non-transitory computer-readable storage medium, storing instructions that, when executed by a processor, cause the processor to perform a method comprising:
receiving a geo-fence definition;
receiving a vehicle route;
defining a plurality of reporting-rate changes along the route, at defined points along the route, based on proximity of each defined point to the geo-fence;
varying a variable reporting rate as a vehicle reaches each of the defined points, based on the reporting-rate change defined for each point, the changes representing a reporting rate that varies inversely with vehicle proximity to the geo-fence; and
reporting a vehicle location at intervals based on the variable reporting rate.

* * * * *